US009306683B2

(12) United States Patent
Pikelja et al.

(10) Patent No.: US 9,306,683 B2
(45) Date of Patent: Apr. 5, 2016

(54) COMPACT RADIOFREQUENCY POWER METER

(71) Applicant: Radom Corporation, West Allis, WI (US)

(72) Inventors: Velibor Pikelja, Milwaukee, WI (US); Jovan Jevtic, West Allis, WI (US); Ashok Menon, Shorewood, WI (US)

(73) Assignee: Radom Corporation, West Allis, WI (US)

( * ) Notice: Subject to any disclaimer, the term of this patent is extended or adjusted under 35 U.S.C. 154(b) by 0 days.

(21) Appl. No.: 14/693,180

(22) Filed: Apr. 22, 2015

(65) Prior Publication Data

US 2015/0311990 A1 Oct. 29, 2015

Related U.S. Application Data

(60) Provisional application No. 61/983,715, filed on Apr. 24, 2014.

(51) Int. Cl.
*H04B 17/00* (2015.01)
*H04B 1/16* (2006.01)
*H04B 17/23* (2015.01)
*H04B 17/10* (2015.01)
*H04B 17/309* (2015.01)

(52) U.S. Cl.
CPC .............. *H04B 17/23* (2015.01); *H04B 17/103* (2015.01); *H04B 17/309* (2015.01)

(58) Field of Classification Search
CPC .......... H04B 1/16; H04B 17/00; H04B 17/23; H04K 3/28; H04K 2203/20
See application file for complete search history.

(56) References Cited

U.S. PATENT DOCUMENTS

| 5,581,173 | A * | 12/1996 | Yalla | G05F 1/147 307/31 |
| 6,600,292 | B2 * | 7/2003 | James | H02J 7/022 320/104 |
| 7,546,137 | B2 * | 6/2009 | D'Hont | G06K 7/0008 370/282 |
| 7,684,751 | B2 * | 3/2010 | Posamentier | H04K 3/28 398/39 |
| 7,940,921 | B2 * | 5/2011 | Bark | H04M 3/005 379/390.01 |
| 8,417,191 | B2 * | 4/2013 | Xia | H04B 7/0617 342/368 |
| 2013/0259093 | A1 * | 10/2013 | Kuo | H01Q 1/243 375/145 |

* cited by examiner

*Primary Examiner* — Pablo Tran
(74) *Attorney, Agent, or Firm* — Boyle Fredrickson, S.C.

(57) ABSTRACT

A compact and versatile power meter is created through the use of a discrete component network providing for phased splitting and combining of signals obtained at taps along a transmission conduit having a predefined phase separation. The use of the discrete component network eliminates the need for bulky waveguides or microstrip antenna designs, the latter providing phase shift through their physical dimensions.

8 Claims, 2 Drawing Sheets

COMPACT RADIOFREQUENCY POWER METER

CROSS REFERENCE TO RELATED APPLICATION

This application claims the benefit of U.S. provisional application 61/983,715 filed Apr. 24, 2014, and hereby incorporated by reference.

BACKGROUND OF THE INVENTION

The present invention relates to radio/microwave power measurement devices and in particular to an extremely compact high-power measurement device.

Radiofrequency power meters are used to measure the power of a radiofrequency signal transmitted to an antenna or other load (forward power) as well as to measure reflected power back from the antenna or load (reflected power) such as may provide an indication of a voltage standing wave ratio (VSWR), power consumption or the like. These dual measurements allow determination of the actual amount of power delivered to the load and permit tuning and adjustment of the load or source for optimal power transfer. The term radiofrequency is used herein shall be considered to embrace high-frequency (HF), very high frequency (VHF), ultrahigh frequency (UHF) and microwave frequency signals.

Three common designs for radiofrequency power meters are those which employ waveguides (typically for microwave frequencies) and coaxial or microstrip transmission lines (typically for HF, VHF and UHF frequencies) placed in series between the power transmitter and the load.

In the former design, a primary waveguide is coupled to a secondary waveguide through two ports located to couple signals from the primary waveguide to the secondary waveguide at points with a 90-degree phase difference (one quarter wavelength) at the conducted signal frequency. The outputs of the secondary waveguide at opposite ends will individually isolate the forward and reflected power allowing these two different quantities be measured, for example, with a diode sensor.

In the latter design, signals from the primary transmission line are received by an a transmission line physically analogous to the secondary waveguide, again through openings separated by a 90-degree phase difference (one quarter wavelength) along the primary transmission line. Outputs from the opposite ends of the secondary transmission line isolate the forward and reflected power.

The process of isolating forward and reflected power in both of these designs requires analyzing structures (secondary waveguides or secondary transmission lines) having a length in excess of a quarter wavelength of the measured frequency. For UHF frequencies, for example, this can require constructing carefully tuned structures having a length many centimeters long. Power meters intended for different frequencies can require wide range of different analyzing structures.

SUMMARY OF THE INVENTION

The present invention provides a power meter that employs a discrete component phase shift and summing network for isolating forward and reflected power. This network permits the construction of an analyzer whose dimensions are largely independent of the frequency being analyzed and thus can be extremely compact. By eliminating the need to fabricate large tuned structures of a variety of different sizes, a compact power meter can be created at lower cost using standardized components for a range of frequencies.

In one embodiment, the invention provides an input port for communication with a radiofrequency power source for receiving forward radiofrequency power at a frequency for measurement and an output port separated along a transmission path from the input port for communication with a radiofrequency load for receiving reflected radiofrequency power at the frequency for measurement. A power conduit extending along the transmission path communicates power from the input to the output, and a first and second power tap are coupled to the power conduit and separated along the transition path by an odd integer multiple of a quarter wavelength distance at the frequency. A discrete component network has four ports and receives at a first and second port power, and outputs at a third and fourth port power being a sum of power received at the first and second ports, the power at the third port from the first port shifted by an odd multiple of 90-degrees relative to the power at the third port from the second port, and the power at the fourth port from the second port shifted by an odd multiple of 90-degrees relative to the power at the fourth port from the first port. A computer processor system receives signals from the third and fourth ports and communicates with a display to provide a display of radiofrequency power selected from the group consisting of: forward power, reverse power, voltage standing and wave ratio.

It is thus a feature of at least one embodiment of the invention to provide a power meter that eliminates the need for the construction of a waveguide or microstrip antenna with precise mechanical dimensions for the analysis of power. By employing a four-port network of discrete components, the cost and difficulty of manufacturing a range of power meters is greatly reduced.

The discrete component network may provide an interconnected transformer and one or more capacitors and resistors.

It is thus a feature of at least one embodiment of the invention to make use of standard commercially available power splitter components to isolate forward and reverse power.

An integrated housing of the discrete component network may have a volume with a longest dimension of less than one-quarter wavelength of the frequency;

It is thus a feature of at least one embodiment of the invention, to permit the analysis of radiofrequency signals using a device that may be smaller than a quarter of a wavelength of the signal greatly reducing the size of the power meter.

The computer processor may further provide an output selected from an instantaneous power value and a time-average power value over a longer time than measured by the instantaneous power value and/or selected from power measured in decibels and power measured in watts.

It is thus a feature of at least one embodiment of the invention to provide a set of varied measurements possible from fundamental measurements of forward power and reverse power.

The first and second power taps may be conductive pins having outer threads received by threaded sockets having inner threads in electrical communication with the first and second port of the quadrature combiner, and wherein the conductive pins may be rotated to extend perpendicularly toward and away from the power conduit perpendicular to the axis.

It is thus a feature of at least one embodiment of the invention to provide for a simple tuning method for controlling the balance of power to the first and second ports, the total power drawn from the power conduit.

These particular objects and advantages may apply to only some embodiments falling within the claims and thus do not define the scope of the invention.

DETAILED DESCRIPTION OF THE PREFERRED EMBODIMENT

Figure 1:
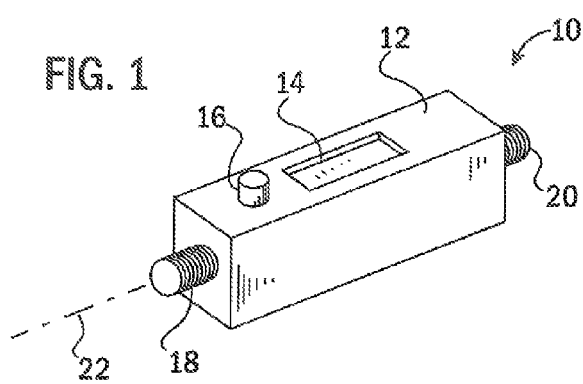
FIG. 1 is a perspective view of the housing of the power meter of the present invention in a first embodiment for receiving coaxial cable.

Referring now to FIG. 1, a power meter 10 for providing radiofrequency power measurements within a given frequency band may provide for a housing 12, for example, of a conductive metal material exposing at an upper face a liquid crystal graphic display 14 for providing measurement readings and a display selector knob 16 for controlling the readings.

Releasable coaxial cable input 18 and output 20 may be aligned along an axis 22 on opposite vertical faces of the housing 12 so that a source of radiofrequency power may be connected to input 18 to pass through the meter 10 to be output at output 20 where it may be attached to a load such as an antenna or the like.

Figure 2:
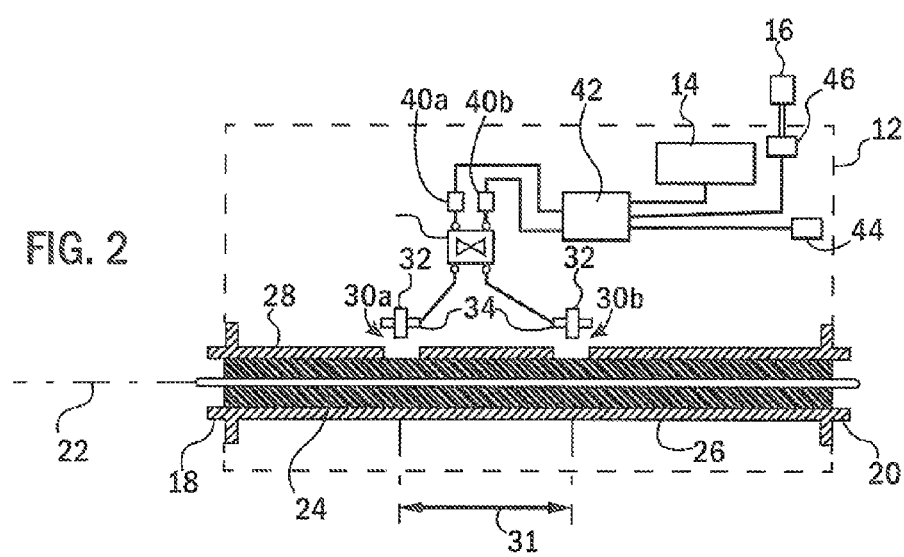
FIG. 2 is a simplified diagram of the circuitry of the power meter of FIG. 1 showing adjustable power taps communicating with an integrated discrete component network and with a microcontroller.

Referring now to FIG. 2, a power conduit 24, for example, a solid metal conductor, may extend along the axis 22 from input 18 to output 20 as surrounded by an insulating dielectric 26 and an outer coaxial conductor 28, for example, a metal tube. The outer coaxial conductor 28 may have two openings 30a and 30b extending through the outer coaxial conductor 28 perpendicular to the axis 22 and the power conduit 24 and separated along the axis 22 by a distance 31 being an odd integer multiple of one quarter wavelength of the radiofrequency to be measured. Typically, this integer multiple will be one.

Positioned outside of the outer coaxial conductor 28 and aligned with the openings 30a and 30b are externally threaded coupling studs 32 extending perpendicularly to the axis 22 and received by internally threaded conductive collars 34. As so held, the studs 32 may be rotated to move them toward and away from the power conduit 24 thereby changing the relative coupling of these conductive collars 34 (through the studs 32) to the power conduit 24. It will be understood that adjustment of the studs 32 may be done to balance the received power at each of the conductive collars 34 and to control the total coupling between the studs and the power conduit 24.

The conductive collars 34 are connected to a first and second port of a four-port hybrid combiner circuit 36. The four-port hybrid combiner circuit 36 may make use of an integrated power splitter commercially available, for example, from Mini-Circuits of Brooklyn, N.Y., under the trade name of QCN-27 (for a frequency range of 1700 to 2700 megahertz) and QCN-5 (for a frequency range of 330 to 580 megahertz), as two non-limiting examples. These integrated power splitter/combiners have a dimension of 0.12 inches by 0.06 inches by 0.35 inches and are formed of an integrated transformer in an integrated sealed package with outwardly communicating solder terminals. In some embodiments additional discrete components including resistors and capacitors may be used. Example technologies for constructing the four-port hybrid combiner circuit 36 are described in U.S. Pat. Nos. 6,963,256 or 6,542,047 hereby incorporated by reference in its entirety.

The remaining third and fourth port of the four-port hybrid combiner circuit 36 may connect to radiofrequency detectors 40a and 40b (for example, diode demodulators) which communicate with analog-to-digital converter inputs of a microcontroller 42. Microcontroller 42 may receive power from external power jack 44 passing through the housing 12. Microcontroller 42 may also communicate with the display 14 to output data on the display 14, and a selector encoder 46 may be attached to the knob 16 to allow user selection of particular displayed quantities as will be discussed below.

Figure 3:
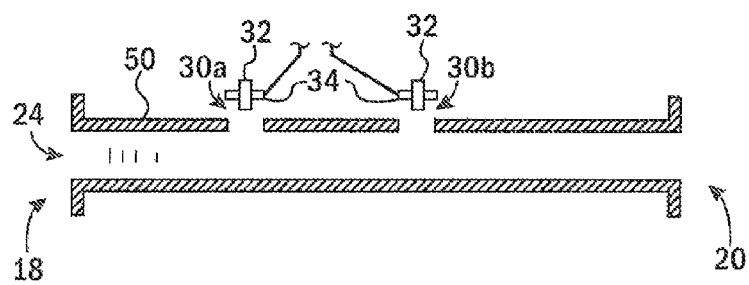
FIG. 3 is a fragmentary portion of the block diagram of FIG. 2 showing a second embodiment for receiving a waveguide.

Referring now to FIG. 3, in an alternative embodiment, the input 18 and output 20 may be waveguide couplers and the power conduit 24 may be a waveguide channel having an outer conductive wall 50 also with openings 30a and 30b separated by an odd multiple of 90-degrees of waveform phase for use with the studs 32 and collars 34 which attach to the same circuitry described above with respect to FIG. 2.

Figure 4:
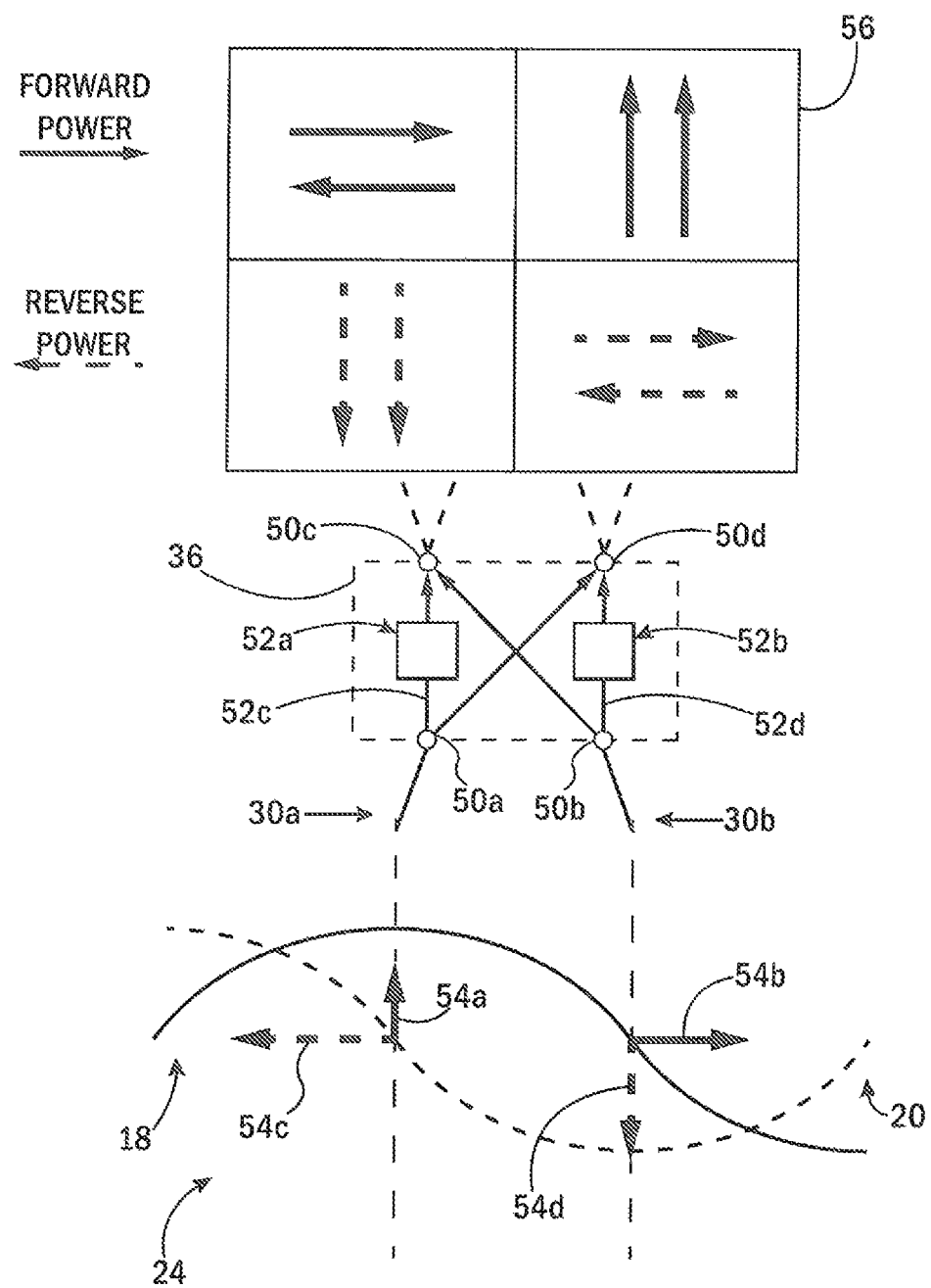
FIG. 4 is a phase diagram showing operation of the integrated discrete component network with 90-degree taps.

Referring now to FIG. 4, in a simple case where the openings 30a and 30b are separated by 90-degrees at the wavelength of the measured frequency, for forward power passing from input 18 to output 20, power received at opening 30b will have a 90-degree phase lag with respect to the power received at opening 30a. The hybrid combiner circuit 36 will receive the power from opening 30a at first port 50a and the power from opening 30b at second port 50b. This power from opening 30a will be transferred by first parallel kg 52a to third port 50c after the introduction of a 90-degree phase lead. Similarly, the power from opening 30b will be transferred by second parallel leg 52b to fourth port 50d after the introduction of a 90-degree phase lead. These phase leads are provided by normal operation of the commercial device discussed above.

Two crossing legs 52c and 52d also connect first port 50a to fourth port 50d, and second port 50b to third port 50c, respectively, without the introduction of phase lead. Thus, port 50c receives the sum of the signal received at port 50a shifted to lead by 90-degrees plus the unshifted signal from port 50b. Similarly port 50d receives the sum of the unshifted signal from port 50a and a signal from port 50b with an added 90-degree phase lead.

It will be appreciated that this circuit 36 allows the distinguishing between forward and reverse (reflective) power in the following way. For power passing in the forward direction from input 18 to output 20, the phase of that power received at port 50a shown by arrow 54a leads the phase of power received at port 50b as shown by arrow 54b by 90-degrees. After passing through the circuit 36 and as depicted in the upper left quadrant of a phase depiction diagram 56, port 50c will show substantially zero output resulting from the destructive cancellation between the signals from ports 50a and 50b which after phase shifting are now in 180-degree opposition. In contrast, as shown in the upper right-hand quadrant of the phase depiction diagram 56, port 50d will show a nonzero magnitude of power as a result of the constructive addition between the signals from ports 50a and 50b which are now in alignment. Thus the power at port 50d isolates the forward power.

Conversely, for reverse power passing from output 20 to input 18 being reflected power from the load, the power at port 50a, shown by arrow 54c, will lag the power at port 50b shown by arrow 54d. In this case, as shown in the lower left quadrant of the phase depiction diagram 56, port 50c will show a nonzero magnitude isolating reflected power, whereas port 50d depicted by the lower right-hand quadrant of the phase depiction diagram 56 will have a zero magnitude. Accordingly, forward power and reflected power may be independently resolved using this circuit.

The microcontroller 42 through selection by knob 16 operates on a selector encoder 46 and may show through display 14 forward power, reverse power, or combinations of forward power and reverse power including, for example, voltage, standing wave ratio or the difference between forward power and reverse power (being the power absorbed by the load). The microcontroller 42 permits the power display to be done on an instantaneous basis or over predefined averaging periods longer than the measurement provided by the instantaneous basis, for example, 10 seconds. Power may be depicted in watts or decibels. It will be appreciated that the microprocessor can practically swap the location of the input 18 and output 20, at least by function, by simply swapping the measurements from ports 50c and 50d to allow more convenient connection of the device according to the location of the power transmitter.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a controller" or "a microcontroller" or a "processor" should be under stood include all computing technology suitable for executing stored programs held in non-transitory form in computer memory associated with such devices.

The term "discrete component network" means networks that are principally constructed of discrete components having actual lumped element properties rather than components with distributed properties. The terms input and output are intended to cover coaxial and microwave couplers and any other communication path allowing for essentially unobstructed energy transfer at the described radio frequencies.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. A radiofrequency power measurement device comprising:
    an input for attachment to a radiofrequency power source for receiving forward radiofrequency power at a frequency for measurement;
    an output separated along a transmission path from the input and for attachment to a radiofrequency load for receiving reflected radiofrequency power at the frequency for measurement;
    a power conduit extending along the transmission path communicating power from the input to the output;
    a first and second power tap coupled to the power conduit and separated along the transmission path by an odd integer multiple of a quarter wavelength distance at the frequency;
    a discrete component network having four ports and receiving at a first and second port power and outputting at a third and fourth port power being a sum of power received at the first and second ports, the power at the third port from the first port shifted by an odd integer multiple of 90-degrees relative to the power at the third port from the second port, and the power at the fourth port from the second port shifted by an odd integer multiple 90-degrees relative to the power at the fourth port from the first port;
    a computer processor system receiving signals from the third and fourth ports and communicating with a display to provide a display of radiofrequency power selected from the group consisting of: forward power, reverse power, voltage and standing wave ratio.

2. The radiofrequency power measurement device of claim 1 further including a first and second power detector measuring the power at the third and fourth port and communicating that measurement to the computer processor system.

3. The radiofrequency power measurement device of claim 1 wherein the discrete component network provides at least one transformer.

4. The radiofrequency power measurement device of claim 1 wherein an integrated housing of the discrete component network has a volume with a longest dimension of less than one-quarter wavelength of the frequency.

5. The radiofrequency power measurement device of claim 4 wherein the integrated housing has a longest dimension of less than 0.25 inches.

6. The radiofrequency power measurement device of claim 1 wherein the computer processor further provides an output selected from an instantaneous power value and a time average power value over a longer time than measured by the instantaneous power value.

7. The radiofrequency power measurement device of claim 1 wherein the computer processor further provides an output selected from power measured in decibels and power measured in watts.

8. The radiofrequency power measurement device of claim 1 wherein the first and second power taps are conductive pins having outer threads received by threaded sockets having inner threads in electrical communication with the first and second ports of the discrete component network, and wherein the conductive pins may be rotated to extend perpendicularly toward and away from the power conduit perpendicular to the transmission path.

* * * * *